(12) United States Patent
Rühl

(10) Patent No.: US 6,305,732 B1
(45) Date of Patent: Oct. 23, 2001

(54) DASHBOARD WITH INTEGRATED DIRECTIONAL MICROPHONE

(75) Inventor: Hans-Wilhelm Rühl, Beethovenstr (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/574,167

(22) Filed: May 18, 2000

(30) Foreign Application Priority Data

May 18, 1999 (DE) .............................................. 199 22 731

(51) Int. Cl.[7] .................................................. B62D 25/14
(52) U.S. Cl. .............................................................. 296/70
(58) Field of Search .................................. 296/70; 180/90

(56) References Cited

U.S. PATENT DOCUMENTS

| | | | |
|---|---|---|---|
| 4,056,696 | * | 11/1977 | Meyerle et al. . |
| 4,060,697 | * | 11/1977 | Neal . |
| 5,548,810 | * | 8/1996 | Riddell et al. ........................... 455/99 |
| 5,771,303 | * | 6/1998 | Mazzarella et al. .................. 381/169 |
| 5,810,420 | * | 9/1998 | Welling ................................ 296/97.5 |
| 6,094,496 | * | 7/2000 | Stowers, Sr. ......................... 381/362 |
| 6,131,042 | * | 10/2000 | Lee et al. .............................. 455/556 |

* cited by examiner

*Primary Examiner*—Joseph D. Pape
(74) *Attorney, Agent, or Firm*—Robert J. Depke; Mayer, Brown & Platt

(57) ABSTRACT

A dashboard includes a microphone with a microphone capsule, which is connected to an electronic unit, in the dashboard of a motor vehicle. The microphone is a directional microphone in the form of a slotted-tube type microphone or of a parabolic mirror type microphone and is aligned with a driver's position.

11 Claims, 1 Drawing Sheet

DASHBOARD WITH INTEGRATED DIRECTIONAL MICROPHONE

BACKGROUND OF THE INVENTION

1. Field of the Invention

The present invention relates to a dashboard of a motor vehicle having a microphone which is connected to a further electronic unit.

2. Description of the Related Art

The use of fixed microphones for providing input to electronic units is know in the art. The electronic unit may be, for example, a mobile phone or a voice recognition system which is connected to a system for the voice control of motor vehicle functions or other functions. Particularly in the case of a voice recognition system, it is important for the voice instructions which are uttered by a person to be understood satisfactorily by the system. For this reason, a sufficiently good signal-to-noise ratio is necessary. However, in motor vehicles there is a large amount of background noise. This includes, for example, not only the noises of the engine and of the movement but also music from an audio system or the voices of other vehicle occupants. The positioning and design of the microphone is therefore highly significant.

The signal-to-noise ratio for the voice signals of a vehicle occupant can be improved in various ways. Because the level of the voice signal decreases as the distance from the speaker's mouth increases, specifically by approximately 6 dB when the distance is doubled, it is advantageous to arrange the microphone as close as possible to the speaker's mouth. Various arrangements of a microphone in the motor vehicle are known.

It is known to integrate a microphone into the inner roof lining. This has the advantage that the microphone is arranged near to the speaker's mouth at a distance of approximately 30 to 40 cm, and therefore a good signal-to-noise ratio is obtained. However, the routing of cables and the restriction in terms of design are disadvantages of this solution.

Furthermore, it is known to provide a microphone on the seat belt. Such belt-mounted microphones are, with their distance of approximately 10 to 20 cm, indeed very close to the driver's mouth, but when the belt is put on they do not automatically assume the correct position and are therefore not very convenient to use.

DE 198 00 442 A1 discloses an embodiment in which a microphone is integrated into the sun visor of a motor vehicle. A disadvantage of this embodiment is that before the microphone is used, the sun visor must always first be moved into the correct position. EP 0 635 395 B1 discloses an embodiment in which a microphone is integrated into the interior mirror of a motor vehicle. A disadvantage with this embodiment is not only the routing of the leads but also in particular the fact that the microphone is further away from the driver than in the previously mentioned solutions.

Furthermore, DE 35 130 017 A1 discloses an arrangement in which a built-in microphone is arranged in the center console or the dashboard of a motor vehicle. Such an arrangement has the disadvantage that it is comparatively far from the speaker and therefore also picks up background noises, for example, the voices of the other vehicle occupants, to a high degree.

M. Dahl et al.: "Simultaneous Echo Cancellation and Car Noise Suppression Employing a Microphone Array", ICASSP97, Munich, Vol. 1, pp. 239–242, discloses the use of a microphone line in the motor vehicle. A disadvantage here is that the microphone line has to be made up of a multiplicity of individual microphones and downstream processing devices in order to achieve the desired accentuation of the voice signals. This embodiment is therefore structurally complex and expensive.

Such a microphone line is classified as a directional microphone. Generally, directional microphones permit signals to be picked up selectively from sound sources in a preferred direction (useful signals), sound sources which do not lie in the preferred direction of the microphone (interference signals) are reduced in terms of their signal level, and thus are not received as well. Various embodiments of directional microphones are known for other applications. The useful signals can be accentuated here in three ways:

Simple directional microphones: known embodiments of microphones include sound pressure receivers and high-speed sound receivers or combinations thereof. Sound pressure receivers receive sound from all directions uniformly. High-speed sound receivers have, on the other hand, a directional characteristic in the form of an eight. Combinations of the aforesaid receivers can also have a directional characteristic in the form of a so-called kidney or a super kidney. An appropriate directional characteristic can increase the sensitivity of the microphones in free space in the preferred direction by up to 8 dB.

When used in a motor vehicle, the microphones must always be placed as flush as possible with a part of the vehicle. They can therefore only be used as boundary surface microphones with a directional characteristic parallel to the surface of the part of the vehicle. The consequence of this is that the speaker is no longer located precisely in the preferred direction and only relatively small accentuations of the level of up to approximately 5 dB can be achieved.

Microphone lines: in a way analogous to the method of elementary radiator synthesis known from antenna technology, it is possible for a microphone line in which a plurality of individual microphones are arranged spatially offset to sample the sound field at various points. The sampled signals are then summed with a suitable propagation time delay in such a way that the sound signals which are incident from the preferred direction of the line are summed in the same phase and thus amplify one another, while the signals from other directions with different phase positions are summed and thus cancel one another out entirely or partially. The use of microphone lines in a motor vehicle is known from the above-mentioned publication.

Microphones with a lobe-shaped directional characteristic: this group includes the slotted-tube type microphone or tubular directional microphone which is composed in its general form of a tubular element which is closed at both ends. The closure, at the "far" end a microphone, contains a capsule which picks up the sound in the tube. Sound can enter the tube through a lateral slot or through a respective row of small openings. If the sound in the tube is considered as a function of the position of an external sound source, it is found that only sound from sources in a position to which the "near" end of the tube points arrives at the microphone capsule in the same phase after entering through the slot and passing on through the tube, while in all the other directions of incidence propagation time differences, and thus reductions in the level of the summed signal, occur. This means that a slotted-tube type microphone operates like a line of microphones of a comparable length, but to form it just one microphone capsule with processing means connected downstream is necessary, and it can therefore be implemented with comparatively little effort.

A directional microphone with a lobe-shaped directional characteristic can also be embodied as a parabolic mirror microphone, like a parabolic antenna, that is to say the accentuation of signals from a preferred direction is achieved in that the signals from the preferred direction of the parabola are reflected onto the focal point of a parabola and arrive there with the same phase position and propagation time. At the focal point of the parabola, a microphone capsule which picks up the sound is mounted. Sound which does not come from the preferred direction in preferably not reflected into the focal point and is therefore picked up with a lower level than sound from the preferred direction.

A disadvantage with commercially available parabolic mirror microphones and slotted-tube type microphones is that owing to their dimensions they are difficult to position in a motor vehicle. Slotted-tube type microphones are provided by various companies with tube lengths of 0.1 to 0.4 m. Parabolic microphones require a sufficiently reflective and focusing surface. Excessively short tubes and too little surface make the directional characteristic too small.

SUMMARY OF THE INVENTION

One object of the invention is therefore to improve a dashboard with a microphone in such a way that a good signal-to-noise ratio for the voice of a vehicle occupant, in particular of the driver, is obtained. Another object is to provide a solution that can be implemented in a visually unnoticeable, cost-effective and technically safe fashion.

These and other objects are achieved with a dashboard of the generic type in that the microphone is embodied as a directional microphone with a lobe-shaped directional characteristic and, in order to pick up voice from a vehicle occupant, it is aligned for a sitting position of the vehicle occupant, in particular that of the driver. For this purpose, the spatially cumbersome mechanical elements of such microphones have to be integrated into the dashboard area in such a way that all the requirements of automobile manufacture are satisfied.

A directional microphone of the type according to the invention which is integrated into the dashboard and aligned with the driver can, given adequate dimensioning, achieve through its directional effect a similar signal-to-noise ratio to that of a microphone mounted on the inner roof lining. Independent, commercially available slotted-tube type microphones may be integrated directly into the dashboard in this context or mounted on the dashboard, but they are comparatively expensive and large. Therefore, in one particularly preferred embodiment of the invention there is a provision for the directional effect of the microphone to be achieved by the shaping of the dashboard and the arrangement of the microphone capsule.

In this specific exemplary embodiment, the dashboard has here an integrated or fitted-on tube with a slot or holes corresponding to the above-mentioned principle of the slotted-tube microphone, the tube being aimed at the speaker to be picked up, and optionally a sound line in the form of a tube which is closed at the ends and which conducts the sound to a microphone capsule mounted at a suitable point.

In a second specific exemplary embodiment, parts of the dashboard are shaped in the form of a portion of a parabolic mirror in order to focus the sound of the voice of the desired speaker on a point at which one or a few microphone capsules can favorably be placed. In this embodiment, an additional device for conducting sound between the focal point and microphone capsule can optionally be positioned. In particular, it is possible to embody a transparent cover of the display elements of the motor vehicle in such a way that the sound waves are focused by means of the transparent cover.

The microphone capsule is preferably arranged on a printed circuit board of a display instrument which is integrated into the dashboard. This results in a particularly cost-effective refinement of a directional microphone.

The invention is described in more detail below with reference to exemplary embodiments and the drawing.

DETAILED DESCRIPTION OF THE PREFERRED EMBODIMENTS

Figure 1:
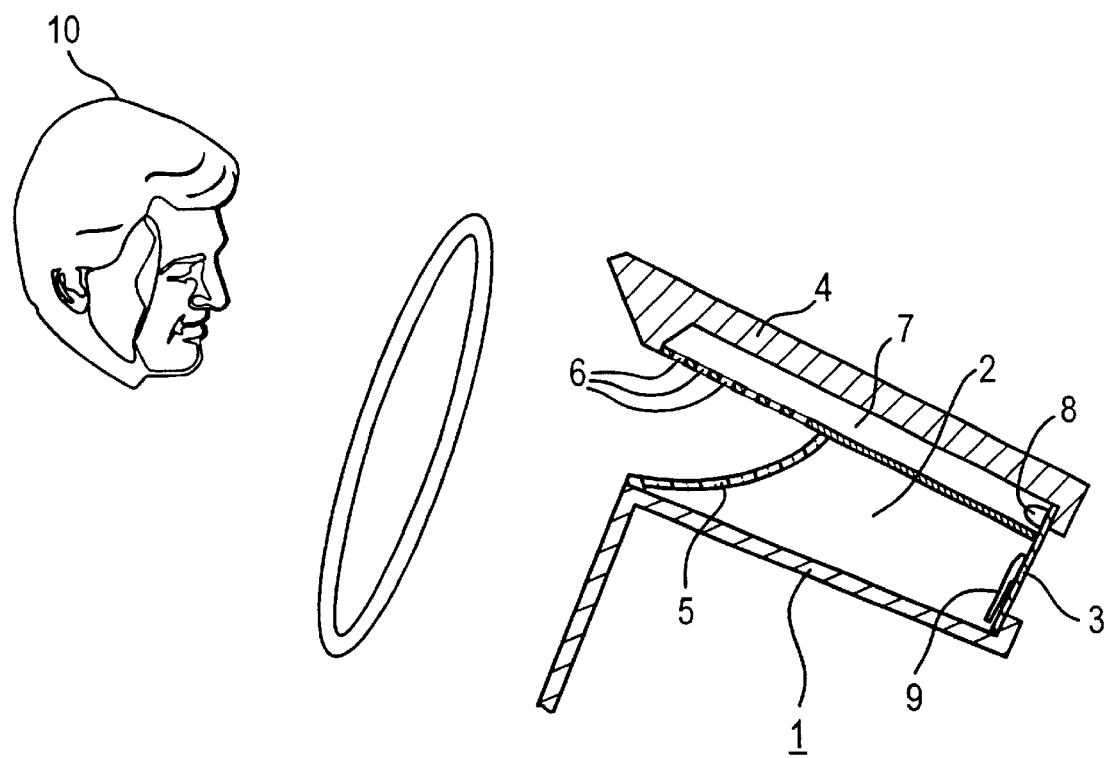
FIG. 1 illustrates a cross-section of a dashboard having a first exemplary embodiment of the present invention.

As shown in FIG. 1, a cross-section of the dashboard 1 includes an instrument panel 3 arranged in a depression 2 on the dashboard.

A baffle cover 4 of the instrument panel 3 is a component of the dashboard 1. The depression 2 in front of the instrument panel 3 is covered by a translucent cover 5. In the dashboard 1 there are holes 6 in the vicinity of the baffle cover 4.

The holes 6 constitute a connection between the interior of the vehicle and a tubular cavity 7 in the dashboard 1 and together implement the mechanical part of a slotted-tube type microphone. The microphone capsule 8 may be arranged at any desired point in the cavity 7 behind the cover 5.

It is particularly advantageous here to position the microphone capsule 8 on the instrument panel 3. This arrangement enables a directional effect of the microphone aligned with the driver's position to be implemented. As a consequence of this, it is possible to obtain a very good separation between the driver's voice and other noises in the vehicle, and thus achieve a good signal-to-noise ratio.

In addition, this embodiment can be implemented cost-effectively. The microphone capsule 8 is mounted on the instrument panel 3 and therefore requires no separate mounting and no housing. The cavity 7 and the holes 6 are already provided when the dashboard is manufactured, with the result that they do not give rise to any particular additional costs. The structure also has the advantage that it can be integrated inconspicuously into the dashboard. The design of the dashboard is virtually unrestricted.

In addition, the arrangement of the microphone capsule 8 on the instrument panel 3 does not make separate cabling necessary. Instead, the microphone capsule 8 with conductor tracks which are mounted on the printed circuit board is connected, for example, to the voice processing system via a bus system. The electronic components of the voice processing system can be positioned at a different suitable point on the motor vehicle, independently of the microphone capsule 8.

In a further embodiment of the invention, the translucent cover 5 is shaped in such a way that voice from the driver 10 is focused by the cover 5 onto the zone 6 in the baffle cover 4 of the dashboard 1. One or more microphones are mounted in this zone 6 in order to pick up the focused sound. The cavity 7 is not necessary in this embodiment. Because the sound strikes the zone 6 in the same phase, if there are a plurality of microphones the output signals of the microphones can be summed electrically to form a single output signal and fed, for example, to the instrument panel 3 for further processing. The further processing of the output signal of the microphone is carried out as in the first exemplary embodiment.

The invention has been explained with reference to two exemplary embodiments. Refinements of these are readily possible. For example, instead of the tubular cavity 7 which is integrated into the dashboard, a separate tubular element which is provided with is slots may also be provided on the dashboard or under the baffle cover 4 of the dashboard. Other modifications and enhancements may also be made which also fall within the spirit and scope of the appended claims.

What is claimed is:

1. A dashboard of a motor vehicle comprising:
    a microphone which is connected to an electronic unit, wherein the microphone is a directional microphone which is directed to a vehicle occupant and further wherein the microphone is located in a cavity of the dashboard.

2. The dashboard as claimed in claim 1, wherein the dashboard is shaped to provide directional control of sound entering the microphone.

3. The dashboard as claimed in claim 1, wherein the dashboard has a slotted-tube type directional microphone which is aligned with the driver.

4. The dashboard as claimed in claim 1, wherein a microphone capsule is arranged on a printed circuit board of a display instrument integrated into the cavity of the dashboard.

5. The dashboard as claimed in claim 1, wherein the microphone has a lobe-shaped directional characteristic.

6. The dashboard as claimed in claim 1, wherein the dashboard contains display instruments and a transparent cover, and wherein the sound waves are focused onto the microphone by means of the transparent cover.

7. The dashboard as claimed in claim 1, further comprising a plurality of microphone capsules.

8. The dashboard as claimed in claim 1, the further comprising a means for processing the analog electric output signal of the microphone located on a printed circuit board of a display instrument which is integrated into the dashboard.

9. The dashboard as claimed in claim 1, wherein output signals from the microphone is fed to a communications unit, which is a hands-free mobile phone.

10. The dashboard as claimed in claim 1, wherein the output signal of the microphone is fed to a voice recognition system.

11. The dashboard as claimed in claim 10, wherein the voice recognition system is a component of a system for the voice control of motor vehicle functions.

* * * * *